(12) United States Patent
Laha et al.

(10) Patent No.: US 8,036,122 B2
(45) Date of Patent: Oct. 11, 2011

(54) INITIATION OF NETWORK TREATMENT FOR DATA PACKET ASSOCIATED WITH REAL-TIME APPLICATION DIFFERENT FROM NETWORK TREATMENT APPLICABLE TO DATA PACKET NON-ASSOCIATED WITH THE REAL-TIME APPLICATION

(75) Inventors: Subhasis Laha, Aurora, IL (US); Jerry Stamatopoulos, North Aurora, IL (US); Patrick Jay Walsh, Bloomingdale, IL (US); David Arthur Welch, Sugar Grove, IL (US)

(73) Assignee: Alcatel Lucent, Paris (FR)

( * ) Notice: Subject to any disclaimer, the term of this patent is extended or adjusted under 35 U.S.C. 154(b) by 1481 days.

(21) Appl. No.: 10/406,352

(22) Filed: Apr. 3, 2003

(65) Prior Publication Data

US 2004/0196786 A1 Oct. 7, 2004

(51) Int. Cl.
*H04L 12/26* (2006.01)
(52) U.S. Cl. ........................ 370/235; 370/329
(58) Field of Classification Search .................. 370/229, 370/235, 236, 913, 330, 329, 349, 352, 392; 705/26; 455/414, 445, 426, 452, 509
See application file for complete search history.

(56) References Cited

U.S. PATENT DOCUMENTS

| | | | | |
|---|---|---|---|---|
| 4,799,215 A * | 1/1989 | Suzuki | | 370/227 |
| 6,028,842 A * | 2/2000 | Chapman et al. | | 370/235 |
| 6,697,352 B1 * | 2/2004 | Ludwig et al. | | 370/349 |
| 6,826,174 B1 * | 11/2004 | Erekson et al. | | 370/352 |
| 6,879,581 B1 * | 4/2005 | Leung | | 370/352 |
| 6,940,836 B2 * | 9/2005 | Borella et al. | | 370/331 |
| 2001/0012288 A1 * | 8/2001 | Yu | | 370/352 |
| 2001/0031634 A1 * | 10/2001 | Mizutani et al. | | 455/425 |
| 2001/0034664 A1 * | 10/2001 | Brunson | | 705/26 |
| 2001/0036201 A1 * | 11/2001 | Dieterich et al. | | 370/506 |
| 2002/0037007 A1 * | 3/2002 | Gross et al. | | 370/389 |
| 2002/0037712 A1 * | 3/2002 | Shin | | 455/414 |
| 2002/0052214 A1 * | 5/2002 | Maggenti et al. | | 455/517 |
| 2002/0065083 A1 * | 5/2002 | Patel | | 455/452 |
| 2002/0089927 A1 * | 7/2002 | Fischer et al. | | 370/229 |
| 2002/0118671 A1 * | 8/2002 | Staples et al. | | 370/352 |
| 2003/0043762 A1 * | 3/2003 | Pang et al. | | 370/328 |
| 2003/0060210 A1 * | 3/2003 | Ravishankar et al. | | 455/452 |
| 2003/0123392 A1 * | 7/2003 | Ruutu et al. | | 370/235 |
| 2003/0156578 A1 * | 8/2003 | Bergenlid et al. | | 370/352 |
| 2004/0047292 A1 * | 3/2004 | du Crest et al. | | 370/235 |
| 2005/0163047 A1 * | 7/2005 | McGregor et al. | | 370/229 |

OTHER PUBLICATIONS

Agilent Technologies; E6702A cdma2000 Lab Application Online User's Guide; http://wireless.agilent.com/rfcomms/refdocs/cdma2kla/c2kla_dc_serv_opt.p; 6 pgs.; Mar. 18, 2003.

* cited by examiner

*Primary Examiner* — Andrew Lai
(74) *Attorney, Agent, or Firm* — Carmen Patti Law Group, LLC

(57) ABSTRACT

A packet control component of an apparatus in one example monitors a data stream that comprises a plurality of data packets. The plurality of data packets comprise one or more first data packets associated with a real-time application and one or more second data packets non-associated with the real-time application. Upon a detection in the data stream of a data packet of the one or more first data packets, the packet control component initiates a network treatment for the data packet that is different from one or more network treatments applicable to the one or more second data packets.

18 Claims, 3 Drawing Sheets

INITIATION OF NETWORK TREATMENT FOR DATA PACKET ASSOCIATED WITH REAL-TIME APPLICATION DIFFERENT FROM NETWORK TREATMENT APPLICABLE TO DATA PACKET NON-ASSOCIATED WITH THE REAL-TIME APPLICATION

TECHNICAL FIELD

The invention relates generally to communications and more particularly to configuration of a network to support real-time applications.

BACKGROUND

A radio access network ("RAN") transmits a data stream to or receives a data stream from a mobile station. For example, the mobile station comprises a mobile telephone, personal digital assistant ("PDA"), or personal computer. The data stream may comprise one or more data packets. In one example, where the data packets are associated with a non-real-time application, the radio access network applies a general network treatment to the data packets. For example, the non-real-time application comprises an internet web browser, email, or a file transfer.

In another example, where the data packets are associated with a real-time application, the radio access network handles the data packets with the same general network treatment. For example, the real-time application comprises a voice over internet protocol ("VoIP") call, a push-to-Talk ("PTT") conversation, or a video teleconference.

A delay in delivery in one example results from the general network treatment. For example, the radio access network employs a radio link protocol ("RLP") retransmission system to retransmit data packets that fail to reach a termination point. The radio link protocol retransmission system may introduce delay in delivery of the data packets. The radio link protocol retransmission system prevents delivery of a data packet until previous data packets are delivered. Since the non-real-time application is not as time sensitive as real-time applications, the delay in delivery may be acceptable for the non-real-time application. However, due to the quality and temporal requirements of the real-time application, the delay in delivery in one example is unacceptable for the real-time application. As one shortcoming, the general network treatment applied to the data packets by the radio access network unacceptably interferes with operation of the real-time application. Such an interference with the operation of the real-time application decreases a quality of service provided by a network for the real-time application.

Thus, a need exists for promotion of an increase in quality of service provided by a network for a real-time application.

SUMMARY

The invention in one embodiment encompasses an apparatus. The apparatus in one example comprises a packet control component that monitors a data stream that comprises a plurality of data packets. The plurality of data packets comprise one or more first data packets associated with a real-time application and one or more second data packets non-associated with the real-time application. Upon a detection in the data stream of a data packet of the one or more first data packets, the packet control component initiates a network treatment for the data packet that is different from one or more network treatments applicable to the one or more second data packets.

Another embodiment of the invention encompasses a method. A data stream is monitored that comprises a plurality of data packets, wherein the plurality of data packets comprise one or more first data packets that comprise an association with a real-time application and one or more second data packets non-associated with the real-time application. A network treatment is initiated for a data packet of the one or more first data packets different from one or more network treatments applicable to the one or more second data packets based on the association of the data packet with the real-time application.

Yet another embodiment of the invention encompasses an article. The article comprises one or more computer-readable media. The article comprises means in the computer-readable medium for monitoring a data stream that comprises a plurality of data packets, wherein the plurality of data packets comprise one or more first data packets that comprise an association with a real-time application and one or more second data packets non associated with the real-time application. The article comprises means in the computer-readable medium for initiating a network treatment for a data packet of the one or more first data packets different from one or more network treatments applicable to the one or more second data packets based on the association of the data packet with the real-time application.

DESCRIPTION OF THE DRAWINGS

Features of exemplary implementations of the invention will become apparent from the description, the claims, and the accompanying drawings in which:

DETAILED DESCRIPTION

Figure 1:
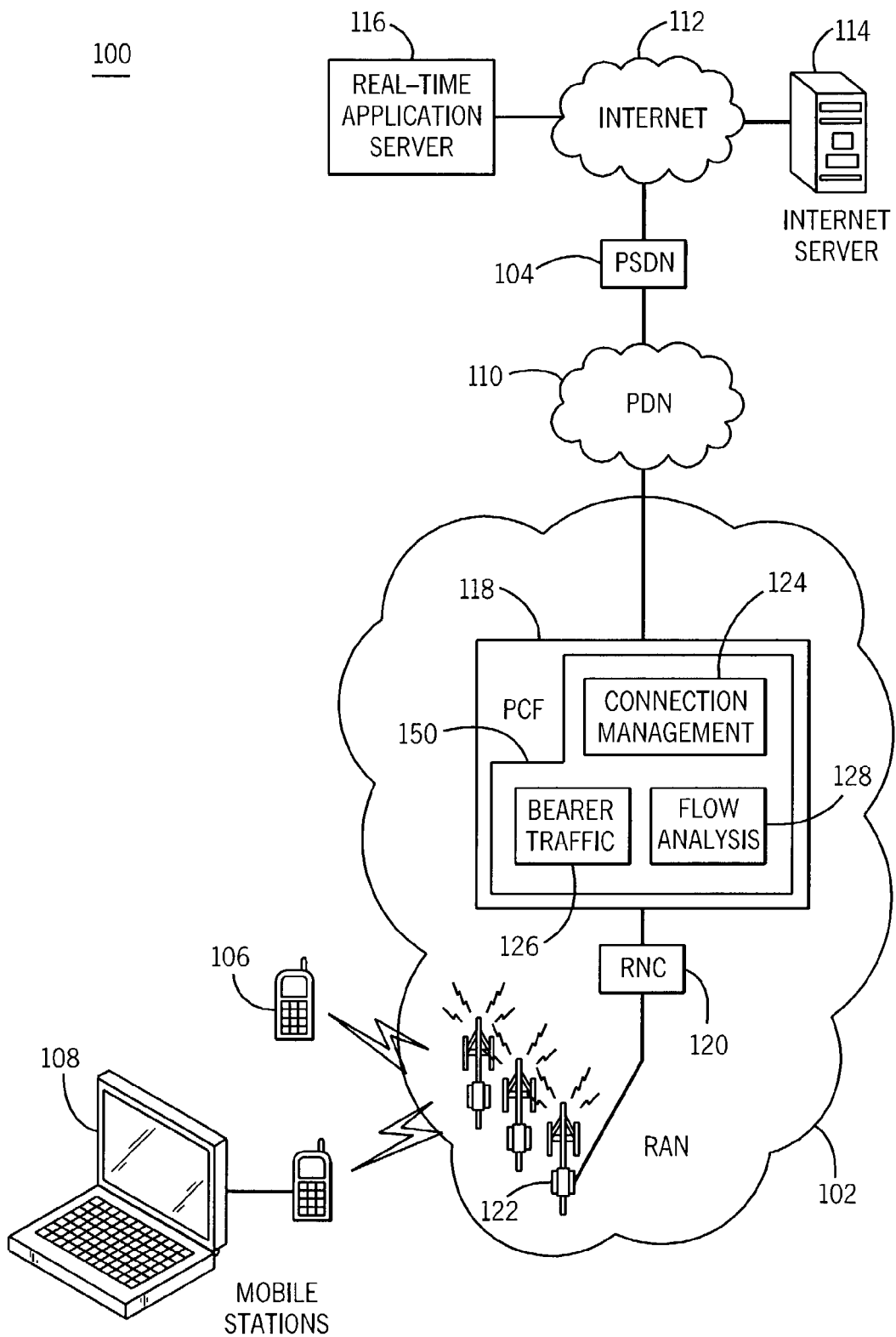
FIG. 1 is a representation of an exemplary implementation of an apparatus that comprises one or more radio access networks, one or more packet data serving nodes, and one or more mobile stations.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more radio access networks ("RANs") 102, one or more packet data serving nodes ("PDSNs") 104, and one or more mobile stations 106 and 108. The radio access network 102 and the packet data serving node 104 communicate through one or more packet data networks ("PDNs") 110. The packet data serving node 104 and one or more content servers communicate through an internet 112. For example, the one or more content servers comprise one or more of an internet server 114 and a real-time application server 116.

The radio access network 102 comprises one or more packet control components 118, one or more radio network controllers ("RNCs") 120, and one or more base stations 122. The packet control component 118 comprises one or more connection management components 124, one or more bearer traffic components 126, and one or more flow analysis components 128.

The connection management component 124 handles communication of signal messages. For example, the connection management component 124 exchanges signal messages with the radio network controller 120 (e.g., A-9 messages) and/or the packet data serving node 104 (e.g., A-11 messages). The bearer traffic component 126 handles communication of bearer packets or frames (e.g., A-8 and A-10 packets). For example, the bearer traffic component 126 accepts bearer packets from the radio network controller 120 (e.g., A-8 packets) and/or the packet data serving node 104 (e.g., A-10 packets). "A-8" and "A-9" in one example serve to represent an interface between the radio network controller 120 and the packet control component 118. "A-10" and "A-11" in one example serve to represent an interface between the packet data serving node 104 and the packet control component 118. The flow analysis component 128 handles assembly of a complete frame from one or more frame fragments. The flow analysis component 128 also decompresses and analyzes the complete frame. For example, the flow analysis component 128 analyzes a content portion of the complete frame to determine whether the complete frame is associated with a real-time application or a non-real-time application (e.g., non-associated with the real-time application).

In one example, the packet control component 118 comprises a packet control function ("PCF"). The packet control component 118 comprises an interface to the packet data network 110 for the radio access network 102. Also, the packet control component 118 comprises an interface to the radio access network 102 for the packet data network 110. A data stream passes though the packet control component 118. The packet control component 118 monitors the data stream. The data stream may comprise one or more data packets that are associated with a real-time application and one or more data packets that are non-associated with the real-time application.

The data stream comprises an unstructured octet stream that may carry point-to-point protocol ("PPP") fragments or frames. The point-to-point protocol fragments and frames comprise data packets. The point-to-point protocol comprises an encapsulation protocol for transporting internet protocol ("IP") traffic over point-to-point links. For example, point-to-point protocol messages carry internet protocol datagrams between the mobile stations 106 and 108 and the packet data serving node 104.

The packet control component 118 collects one or more point-to-point protocol fragments to generate a complete point-to-point protocol frame. For example, the packet control component 118 collects one or more point-to-point protocol fragments sent from the radio network controller 120 towards the packet data network 110. The packet control component 118 comprises a compression algorithm. If the point-to-point protocol is negotiated to use compression, then the packet control component 118 builds up state information for the compression algorithm in order to decompress the point-to-point protocol frame. The packet control component 118 is able to look within the point-to-point protocol frame to determine the type of bearer payload that is within the point-to-point protocol frame.

The packet control component 118 in one example looks at a service option indicator associated with the point-to-point protocol frame to determine an association with the real-time application or the non-real-time application. The service option indicator defines a specific type of traffic in the bearer payload. For example, the packet control component 118 looks for a real-time packet data service option indicator that comprises a version of packet data service option indicator 33 ("SO33") modified for real-time applications. In another example, the packet control component 118 looks for an occurrence of a message that is associated with the point-to-point protocol frame to determine an association of the frame with the real-time application or the non-real-time application. The message that indicates the association with the real-time application comprises one or more of a session initiation protocol ("SIP") message, a substantially equivalent version of a session initiation protocol message (e.g., a proprietary signaling message), and a real-time protocol ("RTP") frame or packet.

In one example, the packet control component 118 receives the point-to-point protocol frame from the radio network controller 120. For example, one of the mobile stations 106 and 108 attempts to initiate a real-time application (e.g., a voice over internet protocol ("VoIP") call, a push-to-Talk ("PTT") conversation, or a video teleconference) by sending the point-to-point protocol frame to the radio access network 102. The one of the mobile stations 106 and 108 may negotiate a service option indicator of the point-to-point protocol frame with the radio access network 102. The mobile stations 106 and 108 employ the real-time packet data service option indicator to indicate to the packet control component 118 that the point-to-point protocol frame is associated with the real-time application.

In another example, the packet control component 118 receives the point-to-point protocol frame from the packet data network 110. To determine the type of bearer payload, the packet control component 118 inspects the point-to-point protocol frame. In one example, the packet control component 118 looks at a header of the internet protocol datagram within the point-to-point protocol frame. The header comprises a source internet protocol address, a destination internet protocol address, and a protocol indication. For example, if the protocol indication specifies user datagram protocol ("UDP"), then the packet control component 118 looks within a user datagram protocol header of the internet protocol datagram. The user datagram protocol header comprises a user datagram protocol port. Different application types correspond to different user datagram protocol ports within the user datagram protocol header. The packet control component 118 determines the type of bearer payload based on the user datagram protocol port. The packet control component 118 may determine that the datagram protocol port indicates that the point-to-point protocol frame comprises a message that transports real-time data or establishes a new real-time data session for the real-time application. For example, the point-to-point protocol frame comprises a session initiation protocol message, a substantially equivalent version of a session initiation protocol message, and a real-time protocol frame or packet.

Upon a detection in the data stream of the point-to-point protocol frame that is associated with the real-time application, the packet control component 118 initiates a network treatment for the point-to-point protocol frame that is different from one or more network treatments applicable to pointto-point protocol frames non-associated with the real-time application. In one example, after the packet control component 118 determines that the point-to-point protocol frame is associated with the real-time application, the packet control component 118 may initiate one or more modifications to a network treatment for the point-to-point protocol frame. In another example, the packet control component 118 may initiate a modification from a first network treatment configured for non-real-time applications to a second network treatment configured for real-time applications.

To change the first network treatment to the second network treatment, the packet control component 118 modifies how the radio access network 102 handles the point-to-point protocol frame. In one example, the second network treatment remains active until one or more participants of the real-time application alert the packet control component 118 that the real-time application is completed. In another example, the second network treatment remains active until the packet control component 118 determines that the real-time application is completed.

The network treatment for the point-to-point protocol frame comprises one or more differences from the one or more network treatments for point-to-point protocol frames non-associated with the real-time application. The radio network controller 120 and the mobile stations 106 and 108 comprise a retransmission system. The retransmission system attempts to resend a data packet that fails to reach a termination point. A first example of one of the one or more differences comprises a deactivation of the retransmission system for the data packets associated with the real-time application. Upon the deactivation of the retransmission system, if a data packet associated with the real-time application fails to reach the termination point of the protocol associated with the data packet, then the data packet is not resent to the termination point. The packet control component 118 indicates to the radio network controller 120 and any of the mobile stations 106 and 108 involved in the real-time application to disable the retransmission system. For example, the radio network controller 120 and the mobile stations 106 and 108 disable radio link protocol ("RLP") retransmissions of dropped data packets. Suppression of data packet retransmission prevents an undelivered packet associated with the real-time application from delaying subsequent data packets associated with the real-time application from being delivered. Therefore, the network treatment for the point-to-point protocol frame promotes an increase in a quality of service for the real-time application.

A second example of one of the one or more differences comprises employment of a second fundamental channel as a replacement for a first fundamental channel. For example, the second fundamental channel is configured to carry real-time applications and the first fundamental channel is configured to carry non-real-time applications. Upon detection of the point-to-point protocol frame associated with the real-time application, the packet control component 118 initiates the change from active operation of the first fundamental channel to active operation of the second fundamental channel. The second fundamental channel has a greater capacity than the first fundamental channel to carry data. Real-time applications (e.g., voice over internet protocol, push-to-talk conversations, and video teleconferences) have more header overhead than non-real-time applications. Employment of the second fundamental channel will promote prevention of a need for lower quality encoding rates to fit the real-time application into the fundamental channel. In one example, the first fundamental channel provides a 9.6 kbps capacity and the second fundamental channel provides a 14.4 kbps capacity. In one example, the second fundamental channel provides the real-time application with sufficient capacity to employ full rate encoding. Therefore, network treatment for the point-to-point protocol frame promotes an increase in a quality of service for the real-time application.

A third example of one of the one or more differences comprises a prevention of a delivery of data packets that are non-associated with the real-time application to participants of the real-time application. The prevention of the delivery, stops the data packets that are non-associated with the real-time application from causing an interruption in the real-time application. Upon activation of the prevention of the delivery, the packet control component 118 will block the participants of the real-time application from involvement in other applications. For example, the packet control component 118 does not deliver data packets that are non-associated with the real-time application to the participants of the real-time application. Therefore, network treatment for the point-to-point protocol frame promotes an increase in a quality of service for the real-time application.

The packet control component 118 initiates network treatment for the point-to-point protocol frame that is different from one or more network treatments applicable to point-to-point protocol frames non-associated with the real-time application by instructing the radio network controller 120 to modify how the radio access network 102 handles the point-to-point protocol frame. The radio network controller 120 implements the deactivation of the retransmission system for the data packets associated with the real-time application and the allocation of the fundamental channel that is configured to carry real-time applications. The radio network controller 120 also sends instructions to implement modifications within the base station 122.

The base station 122 comprises an interface to the mobile stations 106 and 108 for the radio access network 102. Also, the base station 122 comprises an interface to the radio access network 102 for the mobile stations 106 and 108. The base station 122 supports the fundamental channel over an air interface that carries data packets between the mobile stations 106 and 108 and the radio access network 102.

The radio access network 102 transmits data packets to the packet data serving node 104 through the packet data network 110. The packet data serving node 104 comprises an interface to the internet 112 for the radio access network 102. Also, the packet data serving node 104 comprises an interface to the radio access network 102 for the internet 112. In one example, the packet control component 118 may initiate the network treatment for the point-to-point protocol frame that is different from the one or more network treatments applicable to the point-to-point protocol frames non-associated with the real-time application, as described herein. In another example, the packet data serving node 104 may initiate the network treatment for the point-to-point protocol frame that is different from the one or more network treatments applicable to the point-to-point protocol frames non-associated with the real-time application.

The mobile stations 106 and 108 in one example comprise one or more of handheld devices, mobile handsets, cellular phones, mobile computers, and personal digital assistants ("PDAs"). The mobile stations 106 and 108 in one example are operable by one or more users. The users of the mobile stations 106 and 108 in one example comprise human operators.

The mobile stations 106 and 108 communicate with one or more content servers though the internet 112. In one example, the mobile station 106 downloads information from the internet server 114 through the internet 112. The mobile station 106 may load internet web pages, exchange email messages, or transfer files with the internet server 114. In another example, the mobile station 106 is involved in a voice over internet protocol call with the real-time application server 116. The real-time application server 116 may comprise a voice over internet protocol partner, a push-to-talk server, public switched telephone network ("PSTN"), or another mobile station network. In one example, applications that transfer information from the real-time application server 116 are more sensitive to time delays in delivery than applications that transfer information from the internet server 114.

Figure 2:
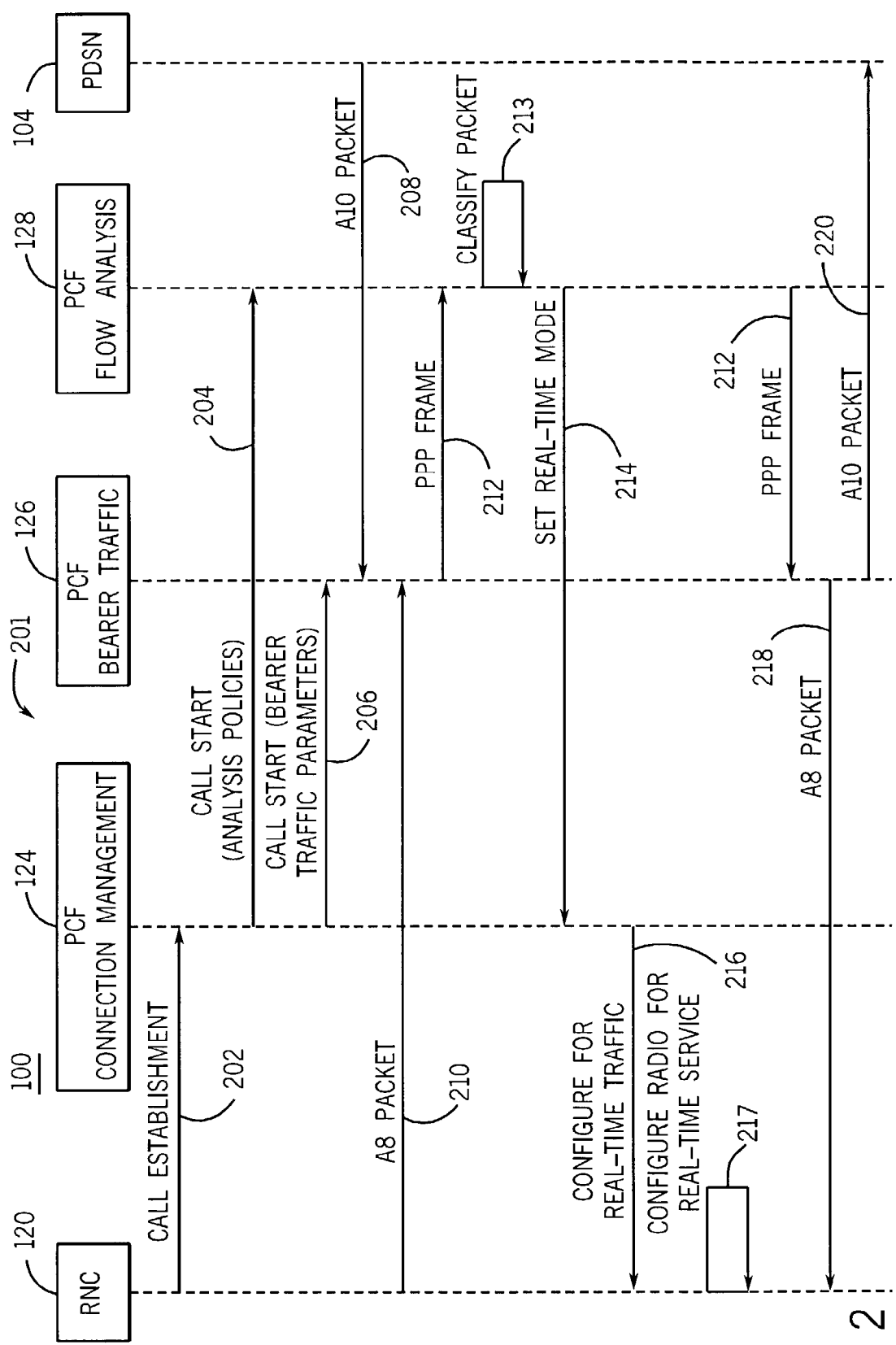
FIG. 2 is a representation of one exemplary message flow for an initiation of a network treatment for a data packet that is different from one or more network treatments for a data packet non-associated with the real-time application for the radio access network of the apparatus of FIG. 1.

Turning to FIGS. 1 and 2, one illustrative description of exemplary operation of the apparatus 100 is presented, for explanatory purposes. A message flow 201 represents exemplary initiation of a network treatment for a data packet that is different from one or more network treatments applicable to a data packet non-associated with the real-time application. The message flow 201 omits additional messages used for call setup, as will be understood by those skilled in the art.

In one example, the radio network controller 120 sends a call establishment message 202 to the connection management component 124. For example, the call establishment message 202 comprises an A-9 message. The call establishment message 202 sets up a packet data call for one of the mobile stations 106 and 108. The connection management component 124 sends a call processing setup message 204 to the flow analysis component 128. "CALL START (ANALYSIS POLICIES)" in one example serves to represent the call processing setup message 204. "ANALYSIS POLICIES" in one example comprise an indication of the one or more characteristics that the flow analysis component 128 is to look for in a data packet. The call processing setup message 204 indicates to the flow analysis component 128 how to classify data packets based on the "ANALYSIS POLICIES." For example, the "ANALYSIS POLICIES" indicates the criteria for classification of data packets by the flow analysis component 128 as being associated with a real-time application or a non-real-time application. The "ANALYSIS POLICIES" in one example comprise a list of one or more of source internet protocol addresses, header markings, protocols, and ports that indicate that a data packet is associated with the real-time application.

The connection management component 124 sends a call bearer setup message 206 to the bearer traffic component 126. "CALL START (BEARER TRAFFIC PARAMETERS)" in one example serves to represent the call bearer setup message 206. "BEARER TRAFFIC PARAMETERS" in one example comprise an indication of one or more connection parameters of the packet data call. The "BEARER TRAFFIC PARAMETERS" in one example provides an internet protocol address of the packet data serving node 104 and a communication key that allows the packet data serving node 104 and the packet control component 118 to communicate.

After the bearer traffic component 126 processes the call bearer setup message 206, then the bearer traffic component 126 is ready to accept the packet data call. The packet data call may come from either the packet data serving node 104 or the radio network controller 120. In one example, the packet data serving node 104 sends a data packet 208 to the bearer traffic component 126. In another example, the radio network controller 120 sends a data packet 210 to the bearer traffic component 126. "A10 PACKET" in one example serves to represent the data packet 208. "A10" in one example serves to represent a bearer interface between the packet data serving node 104 and the packet control component 118. "A8 PACKET" in one example serves to represent the data packet 210. "A8" in one example serves to represent a bearer interface between the radio network controller 120 and the packet control component 118.

The bearer traffic component 126 receives and processes either one of the data packets 208 and 210. The bearer traffic component 126 extracts an information payload from either of the data packets 208 and 210 and sends the information payload to the flow analysis component 128 in a point-to-point protocol frame 212. Upon receipt of the point-to-point protocol frame 212, the flow analysis component 128 executes a classify packet process 213. The classify packet process 213 decompresses and analyzes the point-to-point protocol frame 212. In one example, the flow analysis component 128 determines from the analysis that the point-to-point protocol frame 212 is associated with a real-time application. If the network treatment of data packets is configured for non-real-time applications, then the flow analysis component 128 sends a real-time network treatment configuration message 214 to the connection management component 124. "SET REAL-TIME MODE" in one example serves to represent the real-time network treatment configuration message 214.

Upon receipt of the real-time network treatment configuration message 214, the connection management component 124 sends a real-time network treatment configuration message 216 to the radio network controller 120. For example, the real-time network treatment configuration message 216 comprises an A-9 message. Upon receipt of the real-time network treatment configuration message 216 and if the network treatment of data packets is configured for non-real-time applications, then the radio network controller 120 executes a configure for real-time process 217. The configure for real-time process 217 activates the network treatment for the data packet that is different from the one or more network treatments applicable to the data packets non-associated with the real-time application to facilitate the real-time application. For example, the radio network controller 120 deactivates the retransmission system for the data packets associated with the real-time application and allocates the fundamental channel that is configured to carry the real-time application.

After the network treatment has been modified to facilitate the real-time application, then the flow analysis component 128 sends the point-to-point protocol frame 212 to the bearer traffic component 126. In one example, the bearer traffic component 126 sends a bearer traffic delivery packet 218 to the radio network controller 120. The bearer traffic packet 218 comprises the information of the point-to-point protocol frame 212. The bearer traffic component 126 sends the bearer traffic packet 218 to the radio network controller 120 if the information of the point-to-point protocol frame 212 is destined for one of the mobile stations 106 and 108. In another example, the bearer traffic component 126 sends a bearer traffic packet 220 to the packet data serving node 104. The bearer traffic packet 220 comprises the information of the point-to-point protocol frame 212. The bearer traffic component 126 sends the bearer traffic packet 220 to the packet data serving node 104 if the information of the point-to-point protocol frame 212 is destined for the internet 112. "A8 PACKET" in one example serves to represent the bearer traffic packet 218. "A10 PACKET" in one example serves to represent the bearer traffic packet 220.

Figure 3:
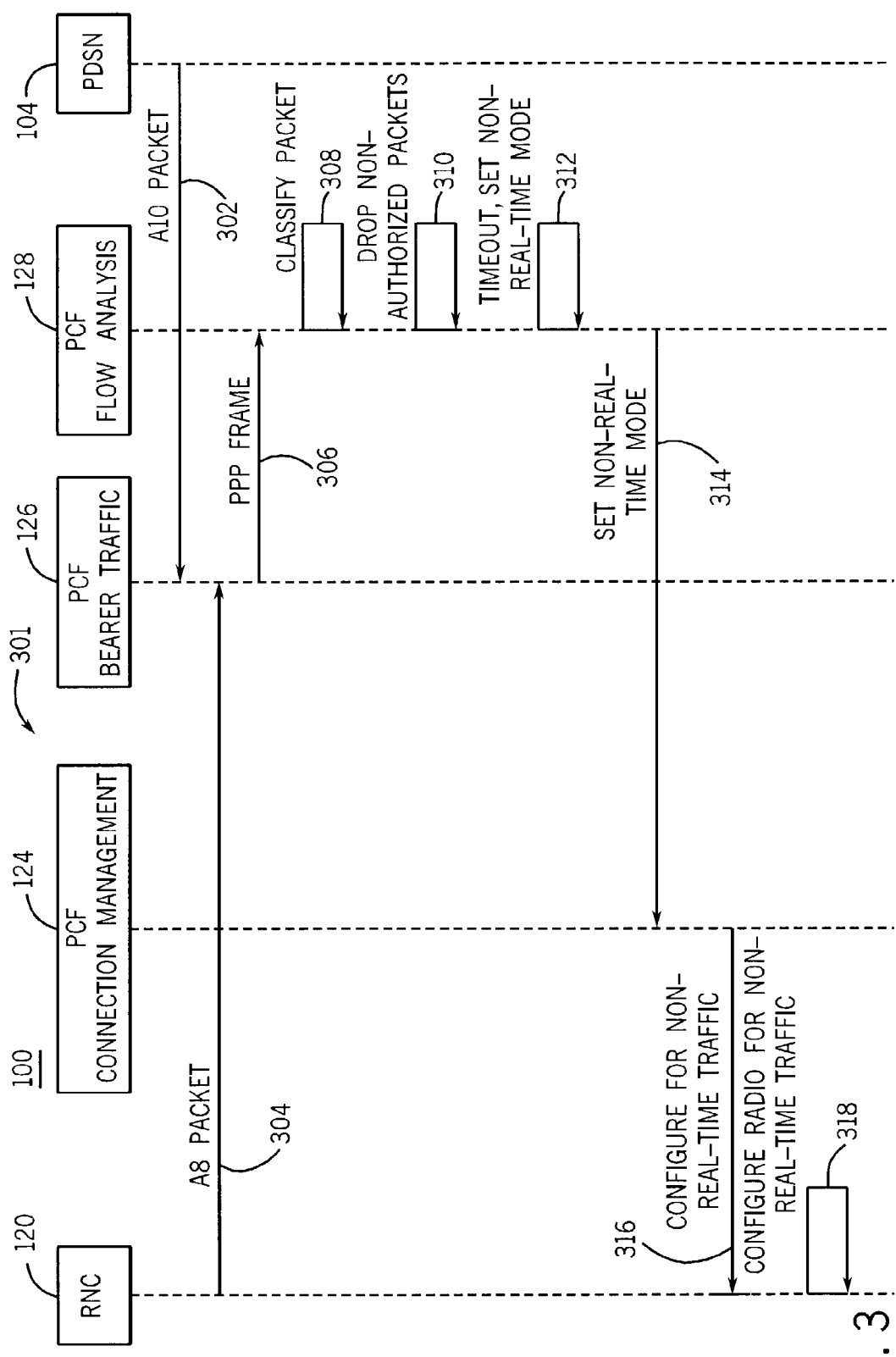
FIG. 3 is a representation of one exemplary message flow for a prevention of a delivery of data packets that are non-associated with a real-time application to participants of the real-time application and exemplary expiration of a network treatment for the data packet associated with thee real-time application for the radio access network of the apparatus of FIG. 1.

Turning to FIGS. 1 and 3, another illustrative description of exemplary operation of the apparatus 100 is presented, for explanatory purposes. A message flow 301 represents exemplary execution of the prevention of the delivery of data packets that are non-associated with the real-time application to participants of the real-time application. Also represented in the message flow 301 is exemplary expiration of the network treatment for the data packet associated with thee real-time application. The message flow 301 omits additional messages used for call setup, as will be understood by those skilled in the art. The message flow 301 assumes that the network treatment for the data packet associated with thee real-time application has been set up as described in the message flow 201.

The packet data serving node 104 or the radio network controller 120 may initiate a packet data call. In one example, the packet data serving node 104 sends a data packet 302 to the bearer traffic component 126. In another example, the radio network controller 120 sends a data packet 304 to the bearer traffic component 126. "A10 PACKET" in one example serves to represent the data packet 302. "A8 PACKET" in one example serves to represent the data packet 304. The bearer traffic component 126 extracts an information payload from either of the data packets 302 and 304 and sends the information payload to the flow analysis component 128 in a point-to-point protocol frame 306. Upon receipt of the point-to-point protocol frame 306, the flow analysis component 128 executes a classify packet process 308. The classify packet process 308 decompresses and analyzes the point-to-point protocol frame 306.

In one example, the flow analysis component 128 determines from the analysis that the point-to-point protocol frame 306 is associated with a non-real-time application. If the flow analysis component 128 determines that the point-to-point protocol frame 306 is destined for a participant of the real-time application and the network treatment of data packets is configured for the real-time application, then the flow analysis component 128 executes a drop non-authorized packet process 310. The drop non-authorized packet process 310 drops the point-to-point protocol frame 306. For example, the flow analysis component 128 does not deliver the point-to-point protocol frame 306 to the participant of the real-time application.

In another example, the flow analysis component 128 determines from the analysis that the point-to-point protocol frame 306 indicates a completion of the real-time application. In yet another example, the flow analysis component 128 determines that a timeout has been reached by the network treatment of data packets configured for the real-time application. A timeout value comprises a time duration that the network treatment of data packets configured for the real-time application remains active. For example, the flow analysis component 128 compares the timeout value with an amount of time elapsed since receipt of a data packet associated with the real-time application to determine if the timeout has been reached. Upon determination that the real-time application is complete, the flow analysis component 128 executes an set non-real time mode process 312. The set non-real time mode process 312 sends a non-real-time network treatment configuration message 314 to the connection management component 124. "SET NON-REAL-TIME MODE" in one example serves to represent the non-real-time network treatment configuration message 314.

Upon receipt of the non-real-time network treatment configuration message 314, the connection management component 124 sends a non-real-time network treatment configuration message 316 to the radio network controller 120. For example, the real-time network treatment configuration message 316 comprises an A-9 message. Upon receipt of the real-time network treatment configuration message 316, the radio network controller 120 executes a non-real-time configuration process 318. The non-real-time configuration process 318 activates the network treatment of data packets configured for the non-real-time application. For example, the radio network controller 120 re-activates the retransmission system for the data packets associated with the non-real-time application and allocates the fundamental channel that is configured to carry non-real-time applications.

The apparatus 100 in one example employs one or more computer readable media. Computer-readable medium for the apparatus 100 consists of a recordable data storage medium 150 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus for managing transfer of data packets between mobile stations and a packet data network (PDN) using radio link protocol (RLP) retransmission, comprising:
   a packet control component operable to be connected between a radio network controller (RNC) and the packet data network for controlling the transfer of the data packets between one or more of the mobile stations, coupled to the RNC, and the packet data network, said packet control component comprising;
   a connection management component for controlling the transfer of the data packets and for causing a mode-indicating signal to be sent to the RNC;
   a bearer traffic component for receiving the data packets from the RNC and the PDN and extracting an information payload from the data packets; and
   a flow analysis component receiving the information payload from the bearer traffic component, for decompressing and analyzing the information payload, for classifying the data packets as being a first data packets associated with a real-time application or a second data packets associated with a non-real-time application and sending the result to the connection management component for use in generating the mode-indicating signal;
   wherein said mode-indicating signal causes the RNC to suspend the RLP retransmission, prevent transfer of the second data packets and allocate a transmission channel to the first data packets that has a higher capacity than a channel used for the RLP retransmission.

2. The apparatus of claim 1, wherein the flow analysis component is operable to determine that the data packet is associated with the real-time application by detection of a real-time service option indicator of the data packet; and
   wherein a presence of the real-time service option indicator within the data packet indicates to the connection management component to generate the mode-indicating signal.

3. The apparatus of claim 2, wherein the real-time service option indicator of the first data packet comprises a first service option indicator; and wherein the flow analysis component is operable to classify subsequent data packet as it one of the first data packets, and wherein the subsequent data packet comprises the real-time service option indicator, and wherein the packet control component is operable to determine that the subsequent data packet is associated with the real-time application by detection of the real-time service option indicator; and wherein the flow analysis component is operable to classify a data packet as a one of the second data packets, and wherein the one of the second data packets comprises a service option indicator different from the real-time service option indicator, and wherein the flow analysis component is operable to determine that the one of the second data packets is non-associated with the real-time application by detection of the second service option indicator.

4. The apparatus of claim 1, wherein the information payload comprises a real-time protocol (RTP) message or a session initiation protocol message, and wherein the presence of the session initiation protocol message indicates to the flow analysis component that the data packet is associated with the real-time application; and wherein the flow analysis component is operable to initiate a configuration of the radio network that carries the data packet for the real-time application based on the occurrence of the session initiation protocol message.

5. The apparatus of claim 1, wherein when one of the RLP retransmission is suspended, if the data packet fails to reach a termination point, then the data packet is not resent to the termination point.

6. The apparatus of claim 1, wherein upon a detection of a completion of the real-time application, the connection management component is operable to change the mode indicating signal to restart the RLP retransmission, allow the transfer of the second data packets and allocate a transmission channel to the second data packets that has a lower capacity than that used by the first data packets.

7. The apparatus of claim 1, wherein the real-time application comprises one or more of a voice over internet protocol communication, a push-to-talk communication, and the video teleconference between the radio network and the mobile station; and wherein the connection management component is operable to initiate the mode-indicating signal for the first data packets to promote an increase in a quality of service for the one or more of the voice over Internet protocol communication, the push-to-talk communication, and the video teleconference.

8. The apparatus of claim 1, wherein the packet control component is operable to collect one or more packet portions from the data stream to generate the data packet; and wherein the packet control component is operable to analyze a content portion of the data packet to determine whether the data packet is associated with the real-time application.

9. The apparatus of claim 1, wherein the packet control component is operable to look within a user datagram protocol header of an internet protocol datagram to determine whether the plurality of data packets comprise the one or more first data packets associated with the real-time application or the one or more second data packets non associated with the real-time application.

10. The apparatus of claim 1, wherein the packet control component is operable to compare a timeout value with an amount of time elapsed since receipt of the data packet associated with the real-time application to determine if the real-time application is complete.

11. The apparatus of claim 1, wherein at least one real-time application is a push-to-talk communication between the radio network and the mobile station.

12. The apparatus of claim 1, wherein the apparatus comprises a biological data storage medium.

13. The apparatus of claim 1 wherein the apparatus comprises an atomic data storage medium.

14. A non-transitory computer-readable medium having computer executable instructions for performing steps, comprising:

monitoring a data stream that comprises a plurality of data packets, wherein the plurality of data packets comprise one or more first data packets that comprise an association with a real-time application and one or more second data packets non associated with the real-time application, and wherein the real-time application comprises one or more services and at least one of the services is a video teleconference between a radio network and a mobile station;

extracting an information payload from a data packet of the plurality of data packets;

decompressing and analyzing the information payload as a point-to-point protocol frame;

determining from the analysis whether the point-to-point protocol frame is a real-time protocol (RTP) signaling protocol message indicating that the data packet is associated with the real-time application; and generating a mode-indicating signal when the RTP signaling protocol message is detected such that, if the mode-indicating signal is detected, RLP retransmission is suspended, transfer of the second data packets is prevented and a transmission channel is allocated to the first data packets that has a higher capacity than a channel used for the RLP retransmission.

15. A method for managing transfer of data packets between mobile stations and a packet data network (PDN) using radio link protocol (RLP) retransmission, comprising the steps of:

monitoring a data stream that comprises a plurality of the data packets, wherein the plurality of the data packets comprise one or more first data packets associated with a real-time application and one or more second data packets non associated with the real-time application, and wherein the real-time application comprises one or more services and at least one of the services is a video teleconference between a radio network and one of the mobile stations;

extracting an information payload from a data packet of the plurality of the data packets;

decompressing and analyzing the information payload as a point-to-point protocol frame;

determining from the analysis whether the point-to-point protocol frame is associated with the real-time application or non associated with the real-time application based on the presence of a real-time protocol (RTP) signaling protocol message that is associated with the data packet;

generating a mode-indicating signal when the RTP signaling protocol message is detected; and if the mode-indicating signal is detected, suspending the RLP retransmission, preventing transfer of the second data packets and allocating a transmission channel to the first data packets that has a higher capacity than a channel used for the RLP retransmission.

16. The method of claim 1, wherein the one or more first data packets employ a first service option indicator as a signal of association with the real-time application, and wherein the one or more second data packets employ one or more second service option indicators as a signal of non-association with the real-time application, and wherein the determining step further comprises the steps of:
   determining that the data packet employs the first service option indicator; and
   determining based on the presence of the first service option indicator that the data packet is associated with the real-time application.

17. The method of claim 1, wherein the step of suspending the RLP retransmission further comprises:
   if the data packet fails to reach a termination point, then the data packet is not resent to the termination point.

18. The method of claim 1, wherein the step of generating the mode-indicating signal further comprises the step of:
   initiating an increase in a quality of service for the one or more of the voice over internet protocol communication, the push-to-talk communication, and the video teleconference.

* * * * *